US007906218B2

(12) United States Patent
Steichen et al.

(10) Patent No.: US 7,906,218 B2
(45) Date of Patent: Mar. 15, 2011

(54) SYSTEM AND A METHOD FOR INKJET IMAGE SUPPORTING MEDIUM

(75) Inventors: Christine E. Steichen, Escondido, CA (US); Chang S. Park, San Diego, CA (US); Xulong Fu, San Diego, CA (US); Emilio Adan, Carlsbad, CA (US); Ronald J. Selensky, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 575 days.

(21) Appl. No.: 11/002,156

(22) Filed: Nov. 30, 2004

(65) Prior Publication Data

US 2006/0115633 A1 Jun. 1, 2006

(51) Int. Cl.
*B32B 27/10* (2006.01)

(52) U.S. Cl. ..................... 428/513; 428/535; 428/537.5; 162/125; 162/130; 162/141; 162/149

(58) Field of Classification Search .................. 162/125, 162/130, 141, 149; 428/513, 535, 537.5
See application file for complete search history.

(56) References Cited

U.S. PATENT DOCUMENTS

| | | | |
|---|---|---|---|
| 4,145,480 | A | 3/1979 | Kusama et al. |
| 4,389,455 | A | 6/1983 | Asao |
| 4,968,554 | A | 11/1990 | Shigetani et al. |
| 5,328,749 | A | 7/1994 | Noda et al. |
| 5,824,462 | A | 10/1998 | Ashida et al. |
| 6,190,781 | B1 | 2/2001 | Tsubaki et al. |
| 6,335,102 | B1 | 1/2002 | Tsubaki et al. |
| 6,482,581 | B1 | 11/2002 | Govers et al. |
| 2004/0185193 | A1 | 9/2004 | Taka et al. |

FOREIGN PATENT DOCUMENTS

| | | | |
|---|---|---|---|
| EP | 0 528 133 | A | 2/1993 |
| EP | 1 445 118 | A | 8/2004 |
| EP | 1 571 000 | | 9/2005 |
| JP | 09-106037 | | 4/1997 |
| JP | 1997-106037 | | 4/1997 |
| JP | 09-119093 | | 6/1997 |
| JP | 1997119093 | | 6/1997 |
| JP | 1997-183266 | | 7/1997 |
| JP | 10-278416 | A | 1/1999 |
| JP | 11-030837 | | 2/1999 |
| JP | 1999-30837 | | 2/1999 |
| JP | 1999-38554 | | 2/1999 |
| JP | 2001-277701 | | 10/2001 |
| JP | 2004-284145 | | 10/2004 |
| JP | 2005-7793 | | 1/2005 |
| JP | 2005-007793 | | 1/2005 |
| WO | WO 2004/113610 | A | 12/2004 |

OTHER PUBLICATIONS

JP OA dated Feb. 16, 2010.

*Primary Examiner* — Betelhem Shewareged

(57) ABSTRACT

An image supporting medium includes a raw base paper, and a film forming resin disposed on at least one side of the raw base paper, wherein the raw base paper is formed of fibers from between 0.5 and 3.0 mm in weighted average length. Additionally, the image supporting medium includes from between 1 and 40% filler by weight.

42 Claims, 3 Drawing Sheets

SYSTEM AND A METHOD FOR INKJET IMAGE SUPPORTING MEDIUM

BACKGROUND

Resin coated image supporting mediums used for photo printing have traditionally included a raw base paper configured for silver halide photo media. Base paper configured for silver halide photo media is a high-quality paper that is specially made for forming prints using negatives. Further, traditional image supporting mediums are typically made waterproof by extruding plastic layers on both sides. The image receiving side is then coated with a number of light-sensitive silver-halide grains that are spectrally sensitized to red, green and blue light for color printing or a number of silver-halide grains that are sensitive to monochromatic light exposure for black and white printing. Traditionally, the image supporting mediums also include gelatin that physically secures the silver-halide grains and facilitates formation of an image.

Conventional silver halide photographic base material has very strict quality requirements due to the complex image developing process, resulting in increased production cost when compared to ordinary fine base paper. For example, silver halide grade raw base paper requires minimum edge liquid penetration and contains an extremely high content of sizing material such as AKD (Alkylketone Dimer). Furthermore, silver halide grade raw base paper can not use any minerals such as Calcium Carbonate due to possible chemical reactions with developing liquid. Moreover, silver halide grade raw base paper should be formed on a machine made of stainless steel to prevent iron sensitization of the silver halide emulsion. Furthermore, due to the strict performance required associated with silver halide base material, forming process rates are typically below 600 m/min.

While many of the above-mentioned costs are attributed to preparing the image supporting medium for use with a silver halide developing process, the relatively expensive silver halide image supporting medium is often used with non-silver halide image forming processes, resulting in an unduly expensive and over-engineered image supporting medium.

SUMMARY

An image supporting medium includes a raw base paper, and a film forming resin disposed on at least one side of the raw base paper, wherein the raw base paper is formed of fibers from between 0.5 and 3.0 mm in weighted average length.

According to one exemplary embodiment, the image supporting medium includes between 1 and 40% fillers by dry weight.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

An exemplary method and apparatus for forming a low cost resin coated image supporting medium is described herein. More specifically, according to one exemplary embodiment, the present method and apparatus produce a low cost resin coated image supporting medium configured to be used with inkjet photo imaging processes by coating a raw base paper with a polyolefin resin. The present specification discloses exemplary systems and methods for forming the image supporting medium as well as exemplary compositions of the raw base paper and resin.

As used in this specification and in the appended claims, the term "raw base paper" is meant to be understood as any unextruded paper that consists of fibers, fillers, additives, etc., used to form an image supporting medium. Similarly, the terms "image supporting medium" and "photo base paper" will be used interchangeably to refer to a resin coated raw base paper that has no inkjet coating formulation disposed thereon. Further, a "coated photo inkjet paper" is meant to be understood as a photo base paper that includes an inkjet formulation coated thereon resulting in a finished structure that can be imaged in an inkjet printer. "Sliver halide" is meant to be understood as any compound made up of silver and a halogen such as chlorine, bromine, or occasionally iodine. Moreover, the term "resin" is meant to be understood as any viscous substance that is substantially transparent or translucent yet not soluble in water. Further, the term "brightness" shall be understood herein as a medium's directional reflectance relative to the reflectance from a standard, such as magnesium oxide, at a light wavelength of 457 nm.

As used in the present specification, and in the appended claims, the term fiber length shall be interpreted broadly as referring to a weighted average fiber length of a pulp after a refining process. Accordingly, if a fiber is 1 mm in length and weighs w mg, then for a given pulp, the weighted average length (L) is $\Sigma(wl)/\Sigma w$, or the sum of the products of the weight times the length of each fiber divided by the total weight of the fibers in the specimen.

In the following description, for purposes of explanation, numerous specific details are set forth in order to provide a thorough understanding of the present system and method for forming a low cost resin coated image supporting medium. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places of the specification are not necessarily all referring to the same embodiment.

Exemplary Structure

Figure 1:
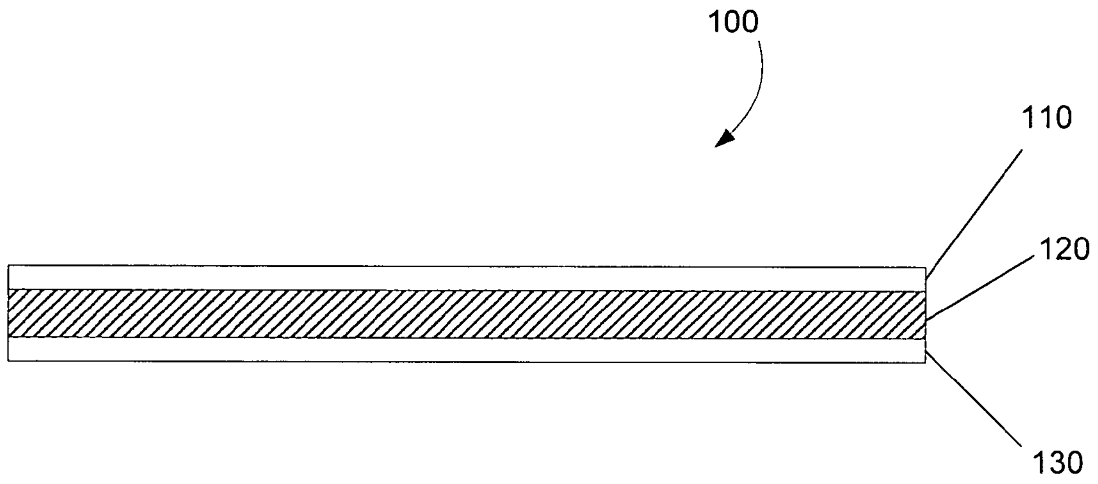
FIG. 1 is a cross-sectional view of an inkjet printable photo medium, according to one exemplary embodiment.

FIG. 1 illustrates an exemplary image supporting medium (100) configured to eventually serve as an image supporting medium for an inkjet printing apparatus, according to one exemplary embodiment. As shown in FIG. 1, the image supporting medium (100) includes a raw base paper layer (120) coated on at least one side with a film forming resin (110). According to the exemplary embodiment illustrated in FIG. 1, the raw base paper layer (120) includes a second film forming resin (130) coating a back surface of the raw base paper layer (120). Further details of the above-mentioned components of the image supporting medium (100) will be given herein.

According to one exemplary embodiment, the image supporting medium (100) illustrated in FIG. 1 is specifically configured for future use with an inkjet printing apparatus. In contrast to traditional silver halide photo base paper that is formed with virgin hardwood fibers to provide specific paper formation qualities and to reduce the possibility of contamination with the silver halide type chemical processing material, the present image supporting medium (100) will not experience complex chemical processing that is susceptible to contamination. Consequently, the inkjet image supporting medium (100) illustrated in FIG. 1 incorporates alternative processes and materials during raw base and extrusion production. Exemplary compositions and properties of the inkjet image supporting medium (100) are described in detail below.

As illustrated in FIG. 1, the exemplary image supporting medium (100) includes a film forming resin (110) formed on at least one surface of the raw base paper layer (120). While traditional photo base paper is engineered for the chemical processes associated with silver halide assisted image forming, the present exemplary image supporting medium (100) incorporates a comparatively less expensive raw base paper layer (120) that provides improved product quality for inkjet photo imaging applications when compared to traditional photo base paper.

According to one exemplary embodiment of the present image supporting medium (100), the raw base paper layer (120) may be made of any number of fiber types including, but in no way limited to, virgin hardwood fibers, virgin softwood fibers, recycled wood fibers, and the like. In contrast to traditional silver halide image forming methods, inkjet image formation methods include non-contact image deposition methods and no developing liquids, thereby eliminating the effect of contamination. The elimination of contamination allows the present raw base paper layer (120) to include any type of fibers including, but not limited to, recycled wood fibers.

Additionally, fibers used to form the present raw base paper layer (120) may be less than approximately 3.0 mm in weighted average length. More specifically, according to one exemplary embodiment, the fibers used to form the raw base paper layer (120) may range in weighted average length from between approximately 0.5 mm to approximately 3.0 mm upon completion of the fiber refining process.

Further, in addition to the above-mentioned fiber sizes, the present image supporting medium (100) may include, but is in no way limited to, a number of filler and additive materials. As mentioned previously, traditional silver halide photo base paper traditionally avoided filler minerals and/or additives to avoid any contamination that may interfere with the silver halide based layer. However, according to the present exemplary embodiment, no silver halide based layer is formed, thereby inviting the inclusion of a number of traditionally avoided filler materials. According to one exemplary embodiment, the filler materials include, but are in no way limited to, clay, kaolin, calcium carbonate ($CaCO_3$), gypsum (hydrated calcium sulfate), titanium oxide, and any other low cost material used to replace cellulose fiber in the image supporting medium (100).

More specifically, according to one exemplary embodiment, up to 40% by dry weight of the raw base paper layer (120) may be made up of fillers including, but in no way limited to, calcium carbonate ($CaCO_3$), Clay, kaolin, gypsum (hydrated calcium sulfate), titanium oxide ($TiO_2$), talc, Alumina trihydrate, magnesium oxide (MgO), minerals, and/or synthetic and natural fillers. Inclusion of the above-mentioned fillers reduced the overall cost of the present image supporting medium (100) in a number of ways. First, the inclusion of white filler such as calcium carbonate enhances the brightness, whiteness, and the quality of the resulting image supporting medium. Consequently, there can be a reduction in the amount of relatively expensive titanium oxide ($TiO_2$) present in the film forming resin (110). Additionally, the enhanced brightness and whiteness facilitate the inclusion of less expensive recycled and synthetic fibers in the formation of the raw base paper layer (120) as mentioned previously. Furthermore, the inclusion of mineral fillers such as calcium carbonate reduces the cost of the raw base paper layer (120) when compared to silver halide embodiments formed solely with pulp fibers. According to one exemplary embodiment, the present raw base paper layer (120) comprises between approximately 1 and 40% mineral fillers by dry weight. According to another exemplary embodiment, the raw base paper layer (120) comprises between approximately 5 and 25% mineral fillers by dry weight.

Additionally, additives that may be added include, but are in no way limited to, sizing agents such as metal salts of fatty acids and/or fatty acids, alkyl ketene dimer emulsification products and/or epoxidized higher fatty acid amides; alkenyl or alkylsuccinic acid anhydride emulsification products and rosin derivatives; dry strengthening agents such as anionic, cationic or amphoteric polyacrylamides, polyvinyl alcohol, cationized starch and vegetable galactomannan; wet strengthening agents such as polyaminepolyamide epichlorohydrin resin; fixers such as water-soluble aluminum salts, aluminum chloride, and aluminum sulfate; pH adjustors such as sodium hydroxide, sodium carbonate and sulfuric acid; optical brightening agents; and coloring agents such as pigments, coloring dyes, and fluorescent brighteners.

In addition to the above-mentioned filler and additive materials, less than 20% of the raw base paper layer (120) may be fine content having a particle size of 0.2-5 microns, including chopped or fragmented small woody fiber pieces formed during the refining process of the pulp. According to one exemplary embodiment, the fine content may range from between 4 to 10% by dry weight. Traditional silver halide raw base paper contains greater than 20% fine content by dry weight. A reduction in fine content facilitates the management of wet-end operation and retention. Additionally, the raw base paper layer may include any number of retention aids, drainage aids, wet strength additives, defoamers, biocides, dyes, and/or other wet-end additives.

Continuing with FIG. 1, according to one exemplary embodiment, a film forming resin (110, 130) is disposed on at least one side of the raw base paper layer (120). According to this exemplary embodiment, the film forming resin (110, 130) is a thermoplastic resin such as a polyolefin resin, a polycarbonate resin, a polyester resin, a polyamide resin or a mixture thereof. According to one embodiment, the thermoplastic resin used as the film forming resin (110, 130) coating at least one surface of the raw base paper layer (120) is a polyolefin resin in the form of a polyethylene resin. Polyethylene resin may be selected to coat at least one side of the raw base paper layer (120) due to its melt-extrusion coatability. According to this exemplary embodiment, the polyethylene resin used to coat at least one surface of the raw base paper layer (120) may include, but is in no way limited to, low-density polyethylene, medium-density polyethylene, high-density polyethylene, straight chain low-density polyethylene, copolymers with .alpha.-olefins, e.g., ethylene and propylene or butylene, carboxy-modified polyethylene resins, and mixtures thereof.

Incorporating the above-mentioned components into an image supporting medium (100) results in a low cost photo base configured for inkjet applications. According to one exemplary embodiment, a number of physical and optical properties of the above-mentioned raw base paper layer (120) were compared to the properties of a traditional silver halide image supporting medium as shown below in Table 1:

TABLE 1

| Physical and Optical Properties | Present Raw Base paper | Prior Art (silver halide base) |
|---|---|---|
| Gurley Porosity - 100 cc | 180 sec or lower | 180 sec or higher |
| Cobb Test with 2 Min. Contact Time | 25 gram/$m^2$ or higher | 25 gram/$m^2$ or lower |
| MD/CD Stiffness Ratio | 1.5~3.0 | 2~2.5 |
| Brightness per Tappi Standard 525 | 95~110 | 93~97 |
| CIE Whiteness per Tappi Standard 560 | 105~140 | 96~105 |
| Opacity per Tappi Standard 425 | 95 or higher for 160 gram/$m^2$ | 93 or lower for 160 gram/$m^2$ |

As illustrated in Table 1 above, the present raw base paper layer (120) is configured to provide improved physical and optical properties for inkjet image formation when compared to traditional silver halide based medium.

As illustrated in Table 1, the present raw base paper layer (120) has a more porous structure as evidenced by the Gurley Porosity illustrated above. Additionally, the present raw base paper (120) has a greater affinity for absorbing water, evidenced by the Cobb Test illustrated above. As shown in Table 1, the Gurley Porosity test shows that the present raw base paper allows 100 cc of air to pass there through in less then 180 seconds while the traditional silver halide image supporting medium required over 180 seconds to allow 100 cc of air to pass, indicating that the present raw base paper layer (120) has a more porous structure than traditional silver halide photo base.

Similarly, the results from the Cobb Test illustrated in Table 1 indicate a more rapid absorption rate than traditional silver halide photo base. According to one exemplary embodiment, the Cobb Test was performed as follows: the raw base paper is clamped in a ring (of inside area 100 $cm^2$) that provides a reservoir for water. After a defined time in contact (e.g.: 2 min), the water is quickly emptied out, the paper blotted to remove unabsorbed water, and the paper weighed. The absorptiveness is the increase in weight (in $g/m^2$). As shown in Table 1, the present raw base paper absorbs 25 grams or more of the water per meter squared while the silver halide raw base paper absorbs less than 25 grams of water per meter squared.

Table 1 also illustrates that the present exemplary raw base paper layer (120) may exhibit a lower MD/CD stiffness ratio than traditional silver halide raw base paper. As used herein, the MD/CD stiffness ratio is an indication of the anisotropy in a raw base paper as well as the ratio of stress in the machine direction (same as operation direction of the paper machine) to the cross-machine direction (perpendicular to the operation direction of the paper machine). According to one exemplary embodiment, the choice of fibers and manufacturing processes used in the present system and method may reduce the MD/CD ratio and thereby reduce the propensity of the final product (or coated photo inkjet paper) to curl, either after or before printing occurs, when environmental conditions such as humidity and temperature change.

Further, Table 1 illustrates an increase in the desired optical properties of brightness, whiteness, and opacity. As illustrated in Table 1, measuring the brightness of the present raw base paper layer (120) per Tappi standard 525 resulted in an improved brightness compared to silver halide raw base paper (95-110 vs. 93-95, respectively). Additionally, an improved whiteness per Tappi standard 560 compared to silver halide raw base (105-140 vs. 96-105, respectively) and opacity per Tappi standard 425 (95 or higher for 160 gram/$m^2$ vs. 93 or lower for 160 gram/$m^2$). The increased brightness, whiteness, and opacity of the present raw base paper layer (120) decrease the amount of expensive Titainium Oxide ($TiO_2$) that needs to be present in the film forming resin (110, 130) while enhancing the quality of the finished image.

While Table 1 illustrates a number of differences between the properties of the present raw base paper layer (120) and traditional silver halide raw base paper, the raw base paper layer (120) produced according to the present system and method also exhibits a number of qualities that are similar to those of the traditional silver halide raw base paper. According to one exemplary embodiment, the present raw base paper layer (120) and traditional silver halide raw base paper exhibit similar formation and smoothness characteristics.

According to one exemplary embodiment, the present raw base paper layer (120) exhibits a formation level of approximately 110 to 120 using a Kajaani Formation apparatus or approximately 0.25 to 0.6 using an Ambertec beta formation tester, both of which test the optical properties of a raw base paper to analyze the uniformity of formation. Similarly, according to one exemplary embodiment, the present raw base paper layer (120) exhibits a smoothness value of approximately 2.0 to 4.0 micrometers using a Park print surface method or approximately 20 to 70 Sheffield Units (SU) using a Sheffield smoothness analysis. These formation levels and smoothness values are substantially similar to corresponding values of traditional silver halide raw base paper. An exemplary forming method for forming the above-mentioned image supporting medium (100) will now be given in detail below.

Exemplary Photo Base Formation System and Method

Figure 2:
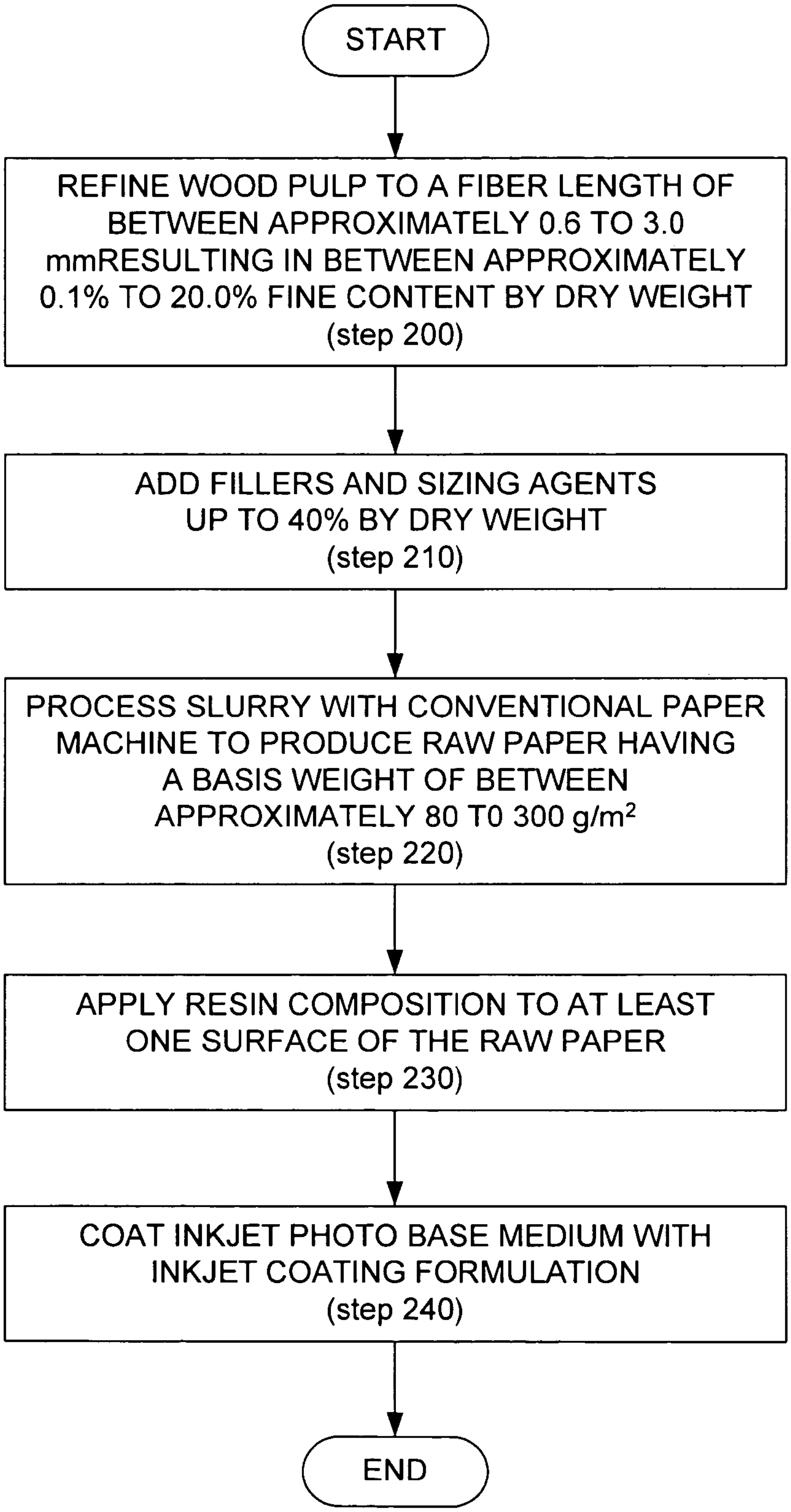
FIG. 2 is a flow chart illustrating a method for forming an inkjet printable photo medium, according to one exemplary embodiment.

According to one exemplary embodiment, the film forming resin is coated on at least one side of the raw base paper layer. FIG. 2 illustrates one exemplary embodiment for forming the raw base paper layer and for coating at least one side of the raw base paper layer with a film forming resin, according to one exemplary embodiment. As illustrated in FIG. 2, the exemplary method for forming the inkjet image supporting medium (100; FIG. 1) begins by first refining a desired wood pulp to a weighted average fiber length of between approximately 0.5 and 3.0 mm (step 200). Once the wood pulp fibers have been refined to the desired length (step 200), they will form a slurry having a fine content that will range from approximately 0.0% to 20.0%. Fillers, such as calcium carbonate, clay, or gypsum; sizing agents; and any additional desired additives may then be added to constitute up to 40% by dry weight of the slurry (step 210). Once the slurry is formed, it may be processed in a conventional paper machine to produce a raw base paper having a basis weight of between approximately 80 and 300 $g/m^2$ (step 220), according to one exemplary embodiment. As used herein, the term "conventional paper machine" shall refer to any paper machine that is not designed to form silver halide raw base paper, i.e. not stainless steel in construction. Once the raw base paper has been formed (step 220), it may then receive a resin composition on at least one of its surfaces (step 230) to form the above-mentioned inkjet image supporting medium (100; FIG. 1). Once formed, the inkjet image supporting medium may then be selectively coated by an inkjet coating formulation (step 240). Further details of each of the above steps will now be given below.

As shown in FIG. 2, the formation process begins by refining a desired wood pulp to a weight averaged fiber length of between approximately 0.5 and 3.0 mm (step 200). According to one exemplary embodiment, refining a desired wood pulp to a weighted average fiber length of between approximately 0.5 and 3.0 mm entails any one of external and internal fibrillation, chopping the pulp, or beating the pulp. Additionally, various combinations of cutting beating and wet beating may be used according to the present exemplary embodiment.

Once the wood pulp fibers have been refined to the desired length (step 200), the fine content generated will range from approximately 0.0% to 20.0% by dry weight in the wood pulp (step 210). As noted previously, the above-mentioned range of fine content is less than silver halide raw base paper (greater than 20% on dry basis). The reduction in the fine content of an inkjet designed raw base paper compared to the traditional silver halide raw base paper can enable higher paper machine speed.

After the desired refining process has been completed, fillers, sizing agents, and any additional desired additives may then be added to form up to 40% by dry weight of the slurry (step 210) in preparation of forming the desired raw base paper layer (120; FIG. 1). According to one exemplary embodiment, mineral fillers are added to the slurry (step 210). According to this exemplary embodiment, any combination of calcium carbonate ($CaCO_3$), Clay, gypsum (hydrated calcium sulfate), titanium oxide ($TiO_2$), talc, Alumina trihydrate, and/or magnesium oxide (MgO) is added to the slurry as fillers. Accordingly, the above-mentioned fillers may constitute up to approximately 40% by dry weight of the slurry.

With the slurry formed, it may then be processed in a conventional paper machine to produce a raw base paper having a basis weight, according to one exemplary embodiment, of between approximately 80 and 300 $g/m^2$ (step 220). Traditional silver halide raw base papers must be formed on expensive paper machines constructed from stainless steel to avoid iron sensitization, a form of contamination. However, for the present exemplary system and method, the use of a stainless steel paper machine is not necessary. While the above-mentioned slurry may be processed at any number of processing rates, the low level of fine may allow the above-mentioned slurry to be processed at rates exceeding 600 m/min, according to one exemplary embodiment.

Figure 3:
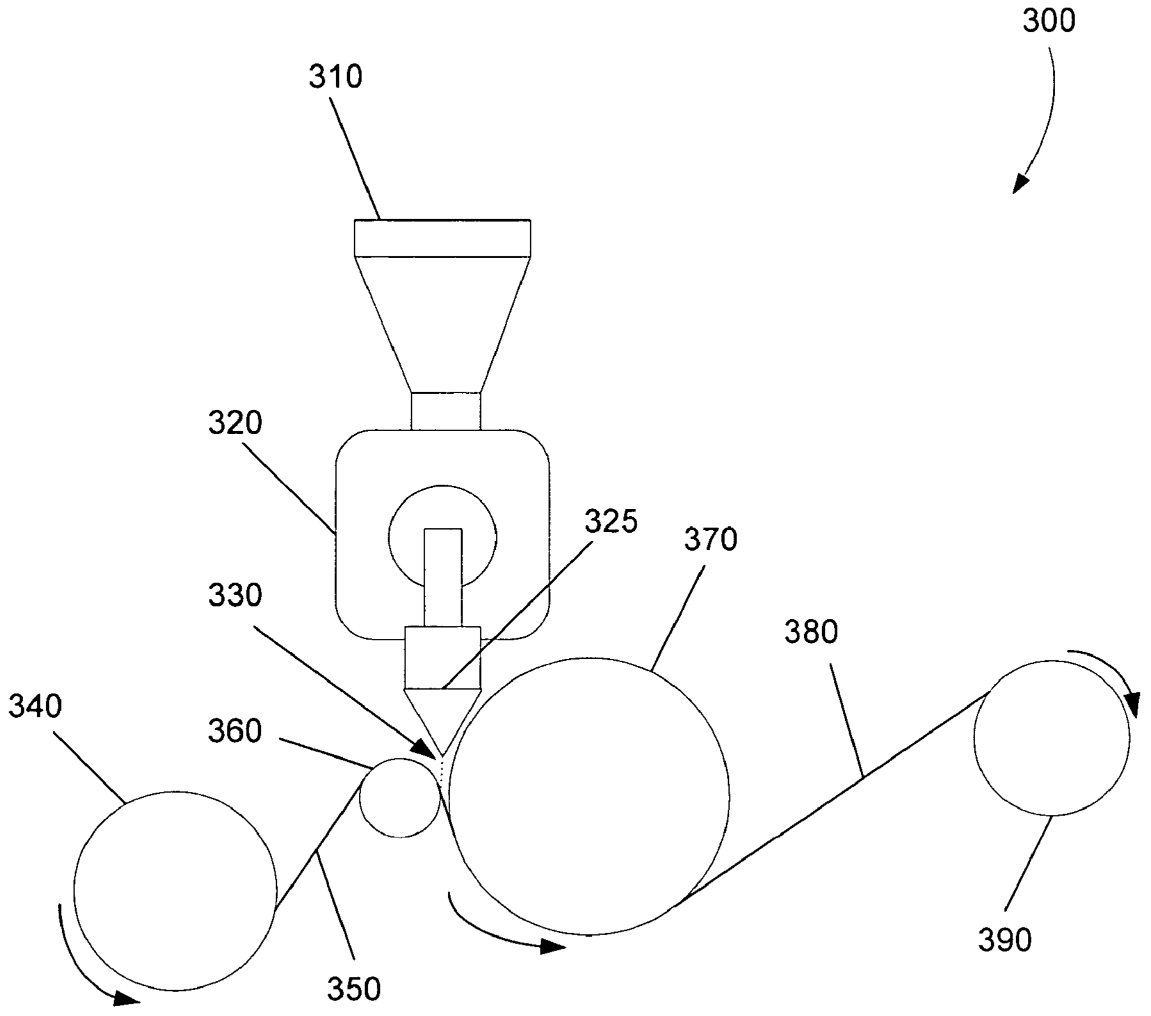
FIG. 3 is a simple block diagram illustrating a manufacturing system configured to produce an inkjet printable photo medium, according to one exemplary embodiment.

Once the raw base paper has been formed (step 220), it may then receive a resin composition on at least one of its surfaces (step 230) to form the above-mentioned inkjet image supporting medium (100; FIG. 1). FIG. 3 illustrates the application of the resin composition onto a surface of the raw base paper using a resin applicator (300), according to one exemplary embodiment. As shown in FIG. 3, the raw base paper (350) is stored on a roll or pay-off (340). During the resin application process (step 230; FIG. 2), the uncoated raw base paper (350) is passed over a pressure roller (360) where it is positioned under a film die (325). As shown in FIG. 3, the film die (325) is fluidly coupled to a hopper (310) and an extruder (320) containing the desired resin. As the uncoated raw base paper (350) is passed adjacent to the film die (325), resin (330) is extruded onto the surface of the raw base paper (350). Once coated, the raw base paper and its new coating are processed by a chill roll (370). Surface finish of the chill roll (370) and the processing conditions of the resin applicator (300) determine the resulting surface finish and gloss of the coated substrate (380). Additionally, a corona treatment may be utilized to enhance the adhesion of the resin (330) on the surface of the raw base paper (350). Additionally, after the resin coating is complete, a gelatin subbing layer may be applied to enhance the adhesion of photo inkjet coating formulation on the resin coated surface. Once coated, the substrate is collected by a windup roll (390) for storage until additional processes are performed thereon, such as inkjet formulation coating, cutting, printing, packaging, etc.

According to one exemplary embodiment of the present system and method, the roughness of the chill roll (370) may vary from approximately 0.25 micro inches to approximately 5 micro inches Ra (average roughness). As used herein, the average roughness (Ra) is measured as the sum of the absolute values of all the areas above and below a surface area mean line divided by the sampling length. It has been found that according to one exemplary embodiment, a chill roll (370) having the above-mentioned roughness produces a glossy surface that is configured for receiving an inkjet coating formulation. Additionally, a number of other process parameters may be varied to vary the final gloss of the resin coated base including, but in no way limited to, nip pressure, chill roll temperature, and melt temperature.

While the resin applicator (300) illustrated in FIG. 3 shows an extrusion apparatus providing a resin (330) on a single surface of a raw base paper (350), the above-mentioned system and method may also be used to provide a resin coating to a plurality of surfaces of the raw base paper (350). Moreover, any number of resin applicators may be used to provide the resin (330) on one or more surfaces of the raw base paper (350) including, but in no way limited to, size press, tab size press, blade coating, air knife coating, extrusion coating, or the like.

Returning again to FIG. 2, once the resin coated photo base paper has been formed (step 230), it may be coated with an inkjet coating formulation (step 240). According to one exemplary embodiment, inkjet coating formulations that may be used to coat the resin coated paper include, but are in no way limited to, polyvinyl alcohols, silica, alumina, gelatins, polymers, and appropriate combinations thereof. Additionally, the inkjet coating formulation may comprise one or more layers. Furthermore, the coated layer(s) may be formed on one or more surfaces of the inkjet image supporting medium. Application of the inkjet coating formulation may be performed by any number of material dispensing means including, but in no way limited to, a slot die coating apparatus, a curtain coating apparatus, a blade coating apparatus, a roll coating apparatus, a gravure coating apparatus, and the like.

After the photo base has received the inkjet formulation, the roll then undergoes a number of converting and packaging operations. According to one exemplary embodiment, the converting and packaging operations that may be performed on the resulting coated photo inkjet paper roll include, but are in no way limited to, cutting, printing, and/or packaging steps that may be performed after the coated photo inkjet paper creation step illustrated in FIG. 2.

Once the inkjet coating formulation has been applied to the resin coated paper, it is prepared to receive an image via an inkjet material dispenser. Inkjet material dispensers that may be used to form images on the resulting photo base include, but are in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc.

In conclusion, the present system and method provide a low-cost resin coated media base configured for use with inkjet image forming methods. More specifically, the inkjet image forming method allows for the use of a base paper incorporating virgin and/or recycled fibers ranging from 0.5 to 3.0 mm weighted average length, from a variety of woods or synthetic sources. Additionally, by relaxing the manufacturing constraints on the image forming medium and the available machines used to manufacture the image forming medium, initial cost of establishing a production facility is greatly reduced. Moreover, the present system and method allows fillers to be included in the present media base to reduce cost and improve the optical qualities of the resulting media base. Further, the use of the above-mentioned components facilitates the formation of a media base that is less susceptible to curl.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An image supporting medium comprising:

a raw base paper; and a film forming resin disposed on at least one side of said raw base paper;

wherein said raw base paper is formed of fibers from between 0.5 and 3.0 mm in weighted average length.

2. The image supporting medium of claim 1, wherein said raw base paper comprises between approximately 1-40% filler by dry weight.

3. The image supporting medium of claim 2, wherein said filler comprises one of a calcium carbonate ($CaCO_3$), a clay, a kaolin, a gypsum (hydrated calcium sulfate), a titanium oxide ($TiO_2$), a talc, an alumina trihydrate, or a magnesium oxide (MgO).

4. The image supporting medium of claim 2, wherein said raw base paper further comprises an additive, said additive including one of a sizing agent, an emulsification product, a strengthening agent, a fixer, a pH adjustor, an optical brightening agent, or a coloring agent.

5. The image supporting medium of claim 1, wherein said raw base paper further comprises one of virgin hardwood fibers or virgin softwood fibers.

6. The image supporting medium of claim 1, wherein said raw base paper further comprises recycled fibers.

7. The image supporting medium of claim 1, wherein said film forming resin comprises a thermoplastic resin.

8. The image supporting medium of claim 7, wherein said thermoplastic resin comprises one of a polyolefin resin, a polycarbonate resin, a polyester resin, or a polyamide resin.

9. The image supporting medium of claim 8, wherein said film forming resin comprises a polyethylene resin.

10. The image supporting medium of claim 9, wherein said polyethylene resin comprises one of a low-density polyethylene, a medium-density polyethylene, a high-density polyethylene, a straight chain low-density polyethylene, a copolymer with alpha-olefin, or a carboxy-modified polyethylene resin.

11. The image supporting medium of claim 1, wherein said raw base paper comprises fine content that is less than 20% by dry weight of said raw base paper.

12. The image supporting medium of claim 1, wherein said raw base paper has an MD/CD ratio of less than 2.

13. The image supporting medium of claim 1, wherein said raw base paper has a Cobb test value of higher than 25 grams/$m^2$.

14. The image supporting medium of claim 1, wherein said raw base paper exhibits a brightness of over 95 per Tappi standard 525.

15. The image supporting medium of claim 1, wherein said raw base paper exhibits a CIE whiteness value of at least 105 per Tappi standard 560.

16. The image supporting medium of claim 1, wherein said raw base paper exhibits an opacity of over 95 for 160 gram/$m^2$ per Tappi standard 425.

17. The image supporting medium of claim 1, wherein said raw base paper exhibits a formation level of approximately 110 to 120 using a Kajaani Formation apparatus or approximately 0.25 to 0.6 using an Ambertec beta formation tester.

18. The image supporting medium of claim 1, wherein said raw base paper exhibits a smoothness level of approximately 2.0 to 4.0 micrometers using a Park print surface method or approximately 20 to 70 Sheffield Units (SU) using a Sheffield smoothness analysis.

19. An image supporting medium comprising:

a raw base paper; and a film forming resin disposed on at least one side of said raw base paper;

wherein said raw base paper includes between approximately 5 to 40% filler content by dry weight;

wherein said raw base paper is formed of fibers from between 0.6 and 0.9 mm in weighted average length.

20. The image supporting medium of claim 19, wherein said raw base paper includes between approximately 5 to 25% filler content by weight.

21. The image supporting medium of claim 19, wherein said filler comprises one of a calcium carbonate ($CaCO_3$), a clay, a kaolin, a gypsum (hydrated calcium sulfate), a titanium oxide ($TiO_2$), a talc, an alumina trihydrate, or a magnesium oxide (MgO).

22. The image supporting medium of claim 19, wherein said raw base paper includes an additive, said additive including one of a sizing agent, an emulsification product, a strengthening agent, a fixer, a pH adjustor, an optical brightening agent, or a coloring agent.

23. The image supporting medium of claim 19, wherein said raw base paper further comprises one of virgin hardwood fibers or virgin softwood fibers.

24. The image supporting medium of claim 19, wherein said raw base paper further comprises recycled fibers.

25. The image supporting medium of claim 19, wherein said film forming resin comprises a thermoplastic resin.

26. The image supporting medium of claim 25, wherein said thermoplastic resin comprises one of a polyolefin resin, a polycarbonate resin, a polyester resin, or a polyamide resin.

27. The image supporting medium of claim 26, wherein said film forming resin comprises a polyethylene resin.

28. An inkjet photopaper comprising:

a means for supporting a medium; and a means for adding a gloss to said means for supporting a medium disposed on at least one side of said medium supporting means;

wherein said medium supporting means is formed of fibers from between 0.5 and 3.0 mm in weighted average length; and wherein said medium supporting means includes between approximately 1 to 40% filler content by dry weight.

29. The inkjet photopaper of claim 28, wherein said medium supporting means further comprises one of virgin hardwood fibers or virgin softwood fibers.

30. The inkjet photopaper of claim 28, wherein said medium supporting means further comprises recycled fibers.

31. The inkjet photopaper of claim 28, wherein said glossy means comprises a thermoplastic resin.

32. The inkjet photopaper of claim 31, wherein said thermoplastic resin comprises one of a polyolefin resin, a polycarbonate resin, a polyester resin, or a polyamide resin.

33. The inkjet photopaper of claim 32, wherein said film forming resin comprises a polyethylene resin.

34. The inkjet photopaper of claim 33, wherein said polyethylene resin comprises one of a low-density polyethylene, a medium-density polyethylene, a high-density polyethylene, a straight chain low-density polyethylene, a copolymer with alpha-olefin, or a carboxy-modified polyethylene resin.

35. The inkjet photopaper of claim 28, wherein said filler comprises one of a calcium carbonate ($CaCO_3$), a clay, a kaolin, a gypsum (hydrated calcium sulfate), a titanium oxide ($TiO_2$), a talc, an alumina trihydrate, or a magnesium oxide (MgO).

36. The inkjet photopaper of claim 28, wherein said medium supporting means further comprises an additive, said additive including one of a sizing agent, an emulsification product, a strengthening agent, a fixer, a pH adjustor, an optical brightening agent, or a coloring agent.

37. The inkjet photopaper of claim 28, wherein said medium supporting means comprise fine content that is less than 20% by dry weight of said medium supporting means.

38. The inkjet photopaper of claim 28, wherein said medium supporting means has an MD/CD ratio of less than 2.

39. The image supporting medium of claim 2, wherein said filler comprises one of gypsum (hydrated calcium sulfate), an alumina trihydrate, or a magnesium oxide (MgO).

40. The image supporting medium of claim 19, wherein said filler comprises one of gypsum (hydrated calcium sulfate), an alumina trihydrate, or a magnesium oxide (MgO).

41. The image supporting medium of claim 11, wherein said raw base paper comprises fine content that is 4 to 10% by dry weight of said raw base paper.

42. The inkjet photopaper of claim 28, wherein said medium supporting means comprise fine content that is 4 to 10% by dry weight of said raw base paper.

* * * * *